(12) United States Patent
Liu et al.

(10) Patent No.: US 11,758,114 B2
(45) Date of Patent: Sep. 12, 2023

(54) VIRTUAL 3D DISPLAY

(71) Applicant: GM Global Technology Operations LLC, Detroit, MI (US)

(72) Inventors: Ke Liu, North Billerica, MA (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/480,624

(22) Filed: Sep. 21, 2021

(65) Prior Publication Data

US 2023/0087201 A1 Mar. 23, 2023

(51) Int. Cl.
| | | |
|---|---|---|
| H04N 13/31 | (2018.01) | |
| B60K 35/00 | (2006.01) | |
| H04N 13/383 | (2018.01) | |
| H04N 13/398 | (2018.01) | |
| G06F 3/01 | (2006.01) | |
| G02B 30/31 | (2020.01) | |
| G02B 27/00 | (2006.01) | |

(52) U.S. Cl.
CPC ............ *H04N 13/31* (2018.05); *B60K 35/00* (2013.01); *G02B 27/0093* (2013.01); *G02B 30/31* (2020.01); *G06F 3/013* (2013.01); *H04N 13/383* (2018.05); *H04N 13/398* (2018.05); *B60K 2370/149* (2019.05); *B60K 2370/152* (2019.05)

(58) Field of Classification Search
None
See application file for complete search history.

(56) References Cited

U.S. PATENT DOCUMENTS

| | | | |
|---|---|---|---|
| 2017/0013188 A1* | 1/2017 | Kothari | G06F 3/017 |
| 2017/0113702 A1* | 4/2017 | Thieberger-Navon | B60W 50/0097 |
| 2018/0367751 A1* | 12/2018 | Devendran | H04N 5/57 |
| 2019/0100135 A1* | 4/2019 | Rothenberg | B60Q 1/44 |
| 2021/0023948 A1* | 1/2021 | Knittl | B60K 37/02 |
| 2021/0208392 A1* | 7/2021 | Jeong | G02B 26/0816 |
| 2021/0219002 A1* | 7/2021 | Barnes | B64D 11/00155 |
| 2022/0191392 A1* | 6/2022 | Kurota | G06T 7/73 |

FOREIGN PATENT DOCUMENTS

| | | |
|---|---|---|
| DE | 69712501 T2 | 12/2002 |
| DE | 10226406 C1 | 12/2003 |
| DE | 102014006338 A1 | 11/2015 |
| DE | 102019122761 A1 | 2/2020 |
| DE | 102018213058 A1 | 3/2020 |
| DE | 202020000423 | 3/2020 |
| DE | 102020213279 A1 | 5/2021 |
| WO | 2009095992 A1 | 8/2009 |

\* cited by examiner

*Primary Examiner* — Talha M Nawaz
(74) *Attorney, Agent, or Firm* — Vivacqua Crane PLLC

(57) ABSTRACT

A virtual 3D display for a motor vehicle includes a substrate and a flexible display positioned on the substrate. The flexible display has two foldable sections and a main section. The main section provides a shared viewing area and each of the foldable sections provides a first and a second independent viewing area.

10 Claims, 10 Drawing Sheets

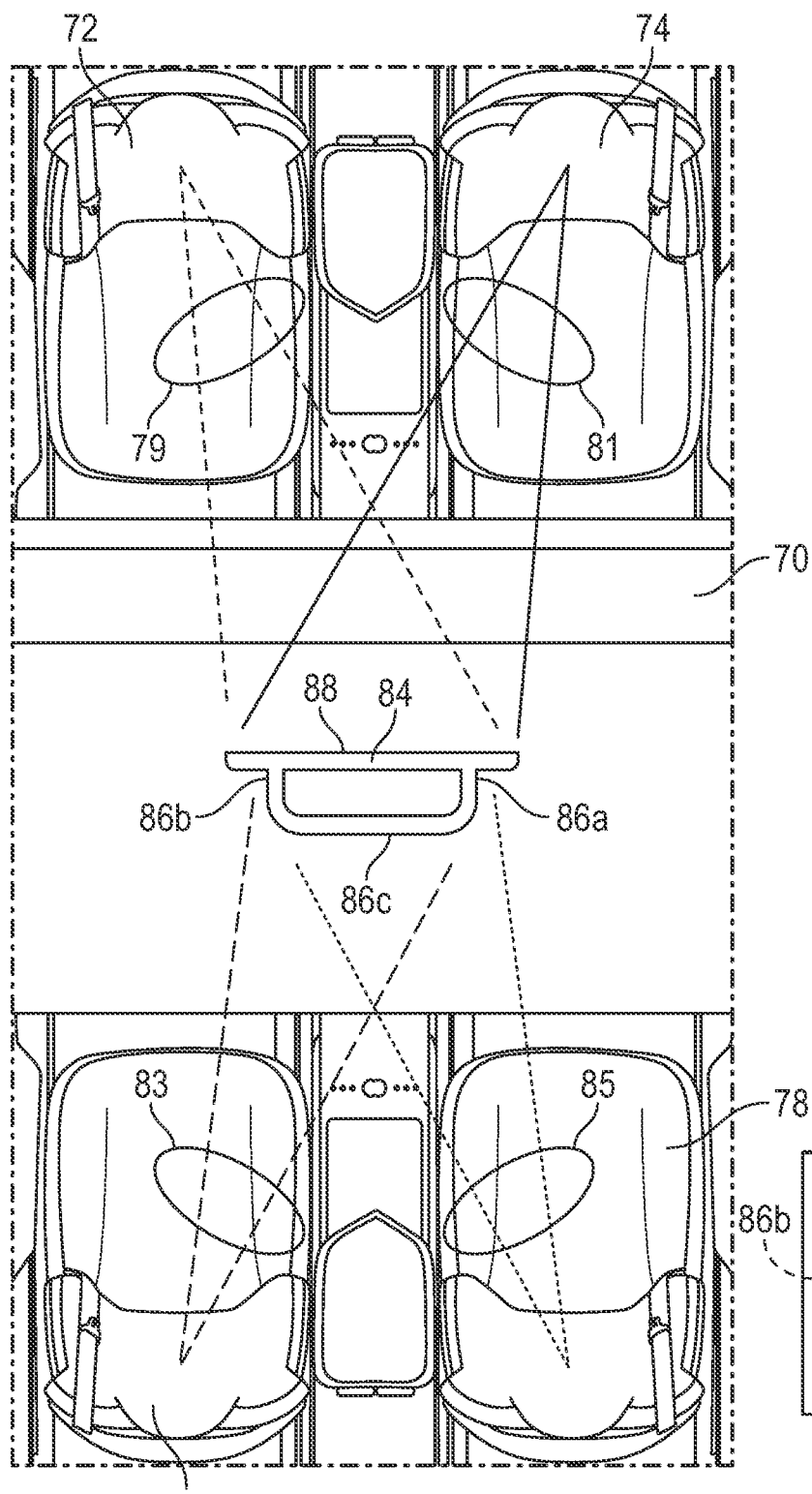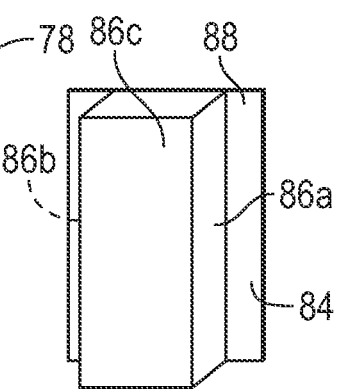
FIG. 5E
FIG. 5F

VIRTUAL 3D DISPLAY

INTRODUCTION

The present disclosure relates to a visual display in motor vehicles. More specifically, the present disclosure relates to a virtual 3D display for motor vehicles.

Many motor vehicles these days include a visual display that is utilized, for example, for infotainment and navigation purposes. Some of these displays are 2D displays that have limited direct context transfer to real world spatial applications. Some proposals include 3D holographic displays. But these displays are costly to implement in a motor vehicle and provide poor interactions between the display and the surrounding environment, especially the depth of view.

Thus, while current motor vehicle displays achieve their intended purpose, there is a need for a new and improved system and method for creating a 3D display.

SUMMARY

According to several aspects, a virtual 3D display for a motor vehicle includes a substrate and a flexible display positioned on the substrate. The flexible display has two foldable sections and a main section. The main section provides a shared viewing area and each of the foldable sections provides a first and a second independent viewing area.

In an additional aspect of the present disclosure, the first viewing area is viewable by a first occupant of the motor vehicle and the second viewing area is viewable ay a second occupant of the motor vehicle.

In another aspect of the present disclosure, the first viewing area is unviewable by the second occupant and the second viewing area is unviewable by the first occupant.

In another aspect of the present disclosure, the 3D display further includes a parallax barrier.

In another aspect of the present disclosure, the parallax barrier is turned on to provide an occupant of the motor vehicle personalized content.

In another aspect of the present disclosure, the parallax barrier is turned off to provide shared viewing to multiple occupants of the motor vehicle.

In another aspect of the present disclosure, the 3D display further includes an eye tracker to determine a location and movement of an occupant's eyes.

In another aspect of the present disclosure, the eye tracker continuously optimizes 3D effects for the occupant with regard to the occupant's viewing location.

In another aspect of the present disclosure, the eye tracker communicates with an on-board computer and graphical processing unit to continuously optimize 3D effects.

In another aspect of the present disclosure, each of the foldable sections is folded about a respective notch in the substrate.

In another aspect of the present disclosure, each of the foldable sections is folded about a respective hinge in the substrate.

In another aspect of the present disclosure, the display reconfigures itself when specific applications are selected or when a specific driving condition occurs.

According to several aspects, a virtual 3D display for a motor vehicle includes a substrate, a flexible display positioned on the substrate, the flexible display having two foldable sections and a main section, and a parallax barrier. The parallax barrier is turned on to provide an occupant of the motor vehicle personalized content and the parallax barrier is turned off to provide shared viewing to multiple occupants of the motor vehicle. The main section provides a shared viewing area and each of the foldable sections provides a first and a second independent viewing area.

In another aspect of the present disclosure, the first viewing area is viewable by a first occupant of the motor vehicle and the second viewing area is viewable ay a second occupant of the motor vehicle.

In another aspect of the present disclosure, the first viewing area is unviewable by the second occupant and the second viewing area is unviewable by the first occupant.

In another aspect of the present disclosure, the 3D display further includes an eye tracker to determine a location and movement of an occupant's eyes.

In another aspect of the present disclosure, the eye tracker communicates with an on-board computer and graphical processing unit to continuously optimizes 3D effects for the occupant with regard to the occupant's viewing location.

In another aspect of the present disclosure, the display reconfigures itself when specific vehicle applications are selected or when a specific driving condition occurs.

According to several aspects, a virtual 3D display for a motor vehicle includes a substrate, a flexible display positioned on the substrate, the flexible display having two foldable sections and a main section, and a sensor that enables interaction between an occupant of the motor vehicle the virtual 3D display. The main section provides a shared viewing area and each of the foldable sections provides a first and a second independent viewing area. The sensor detects gestures by the occupant and detects touches by the occupant.

In another aspect of the present disclosure, the display reconfigures itself when specific vehicle applications are selected or when a specific driving condition occurs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5E illustrates yet another virtual 3D display for multiple occupants of a motor vehicle according to an exemplary embodiment;

FIG. 5F is a close-up view of the virtual 3D display shown in FIG. 5E according to an exemplary embodiment;

DETAILED DESCRIPTION

The following description is merely exemplary in nature and is not intended to limit the present disclosure, application, or uses.

Figure 1:
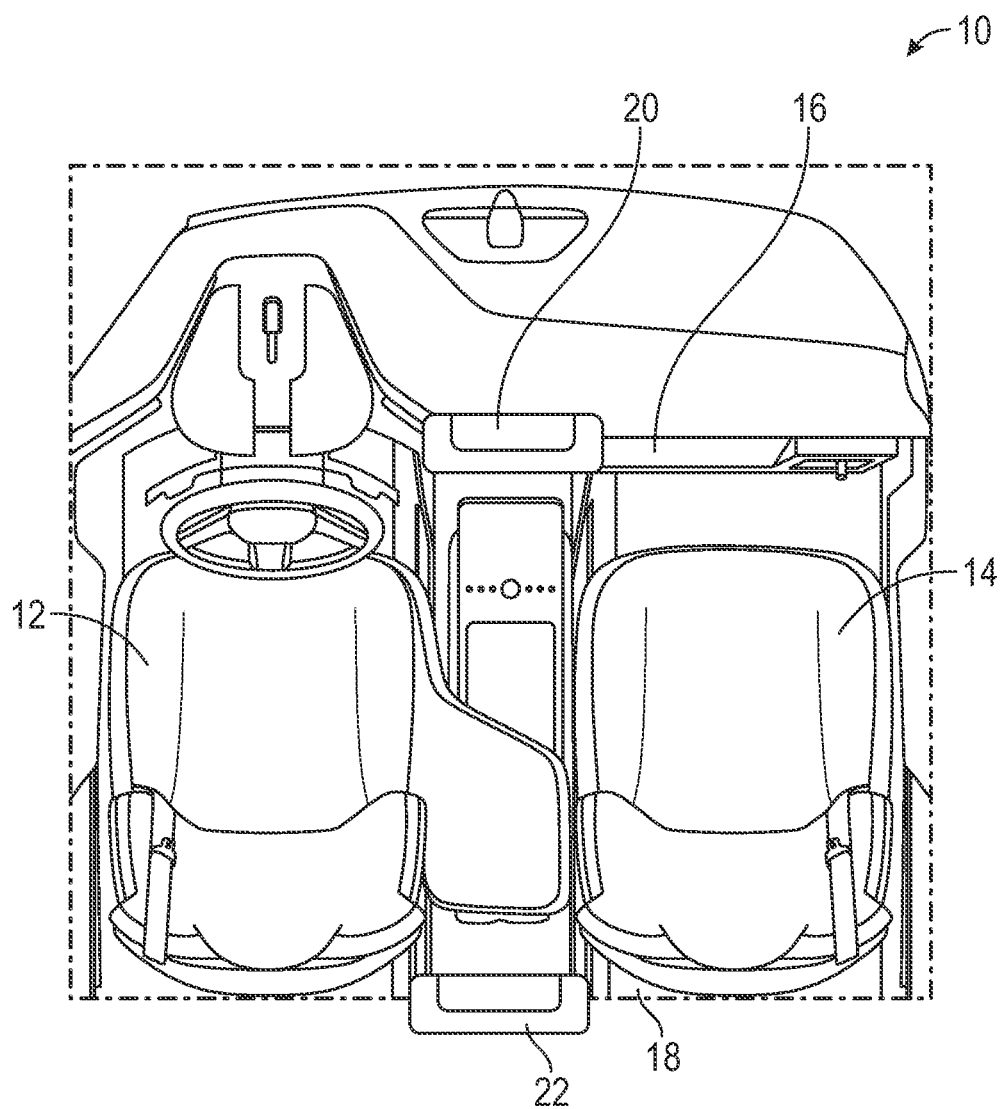
FIG. 1 illustrates a cabin for a motor vehicle with a pair of virtual 3D displays according to an exemplary embodiment.

Referring to FIG. 1, there is shown a portion of a motor vehicle 10 with a cabin 18. Located within the cabin 18 is a driver's seat 12 and a front passenger's seat 14. A display 20 is located on a dashboard 16, and a second display 22 is located behind the driver's seat 12 and the front passenger's seat 14.

The display 20 is viewable by the occupants of the driver's seat 12 and the front passenger's seat 14, while the display 22 is viewable by occupants in the cabin 18 situated behind the driver's seat 12 and the front passenger's seat 14. Each of the of the displays 20 and 22 is capable of providing a virtual 3D image. Further, as described below, each of the displays 20 and 22 is capable of providing a shared viewing area viewing by multiple occupants in the cabin 18, as well as independent viewing areas viewable by only a single occupant.

Figure 2A:
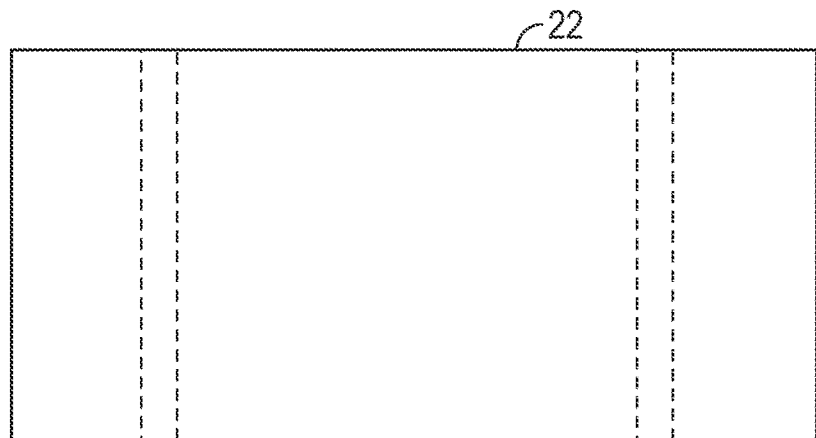
FIGS. 2A-2D illustrate a sequence of steps for forming a foldable display according to an exemplary embodiment.
Figure 2B:
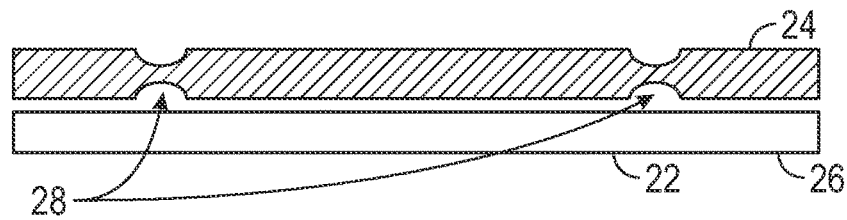
Figure 2C:
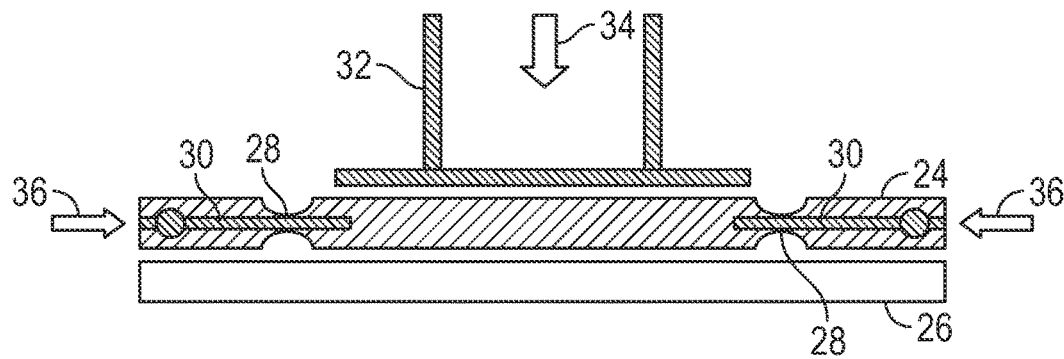
Figure 2D:
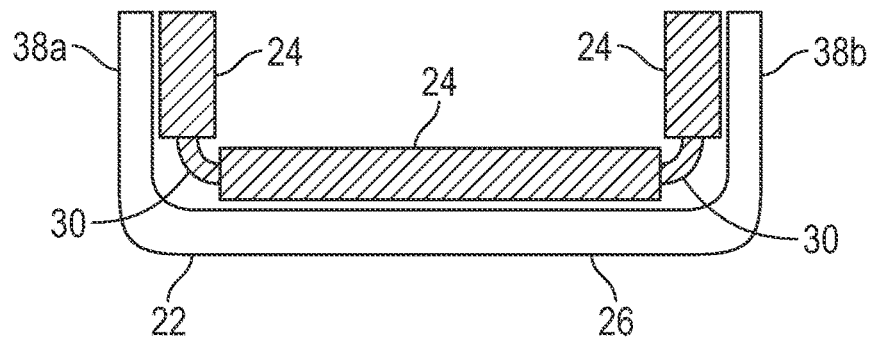
Figure 3A:
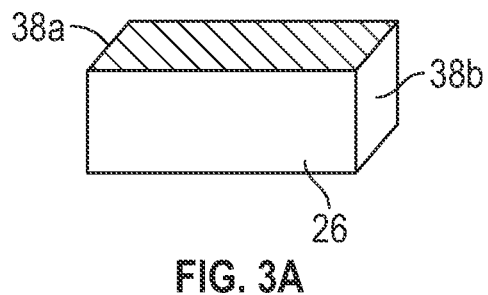
FIG. 3A illustrates a shared display and individual side displays according to an exemplary embodiment.

Turning to FIGS. 2A-2D, there is shown a process for forming a virtual 3D display. For example, as shown in FIGS. 2A and 2B, a panel 22 is positioned adjacent to a substrate 24, which has a pair of notches 28. The substrate 24 is attached to a pair of tracks 30. The tracks 30 are pushed inward, as indicated by the arrows 36, while a press 32 pushes against the substrate 24, as indicated by the arrow 34, to form the folded panel 22 with two side viewing areas 38a and 38b positioned on either side of a shared central viewing area 26, as shown in FIG. 2D. and FIG. 3A. As such, the viewing area 38a is viewable by, for example, the driver, the viewing area 38b is viewing by, for example, the front passenger, and the viewing area 26 is viewable by both the driver and front passenger.

Figure 3B:
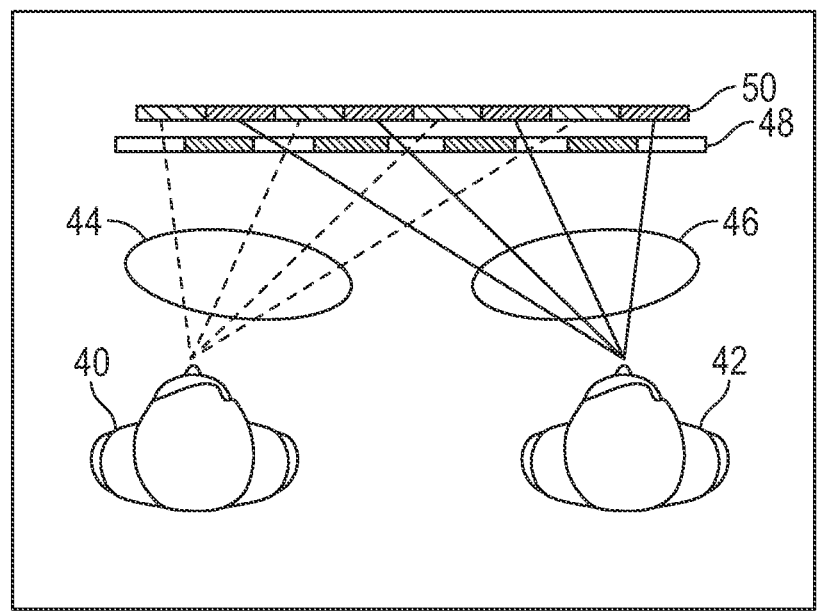
FIG. 3B illustrates a display with a parallax barrier turned on according to an exemplary embodiment.
Figure 3C:
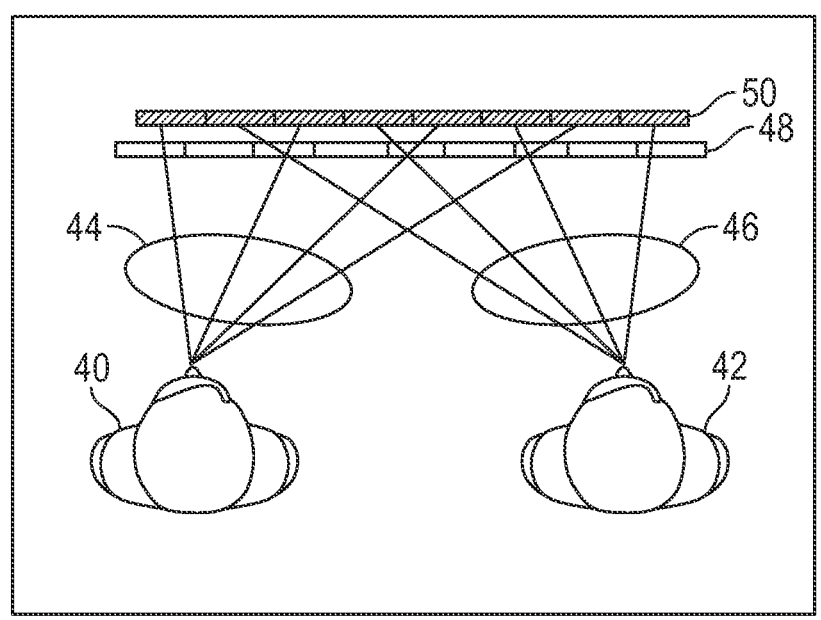
FIG. 3C illustrates a display with a parallax barrier turned off according to an exemplary embodiment.

Referring further to FIGS. 3B and 3C, there is shown the use of a parallax barrier. Specifically, a display panel such as a TFT-LCD panel 50 is utilized in conjunction with a parallax barrier 48. When the parallax barrier 48 is turned on (FIG. 3B), a portion of the panel 50 is within the viewing line of site 44 of a viewer 40, while another portion of the panel 50 is within the viewing line of site 46 of another viewer 42. When the parallax barrier 50 is turned off, the entire panel 50 is viewable by both viewers 40 and 42.

Figure 4A:
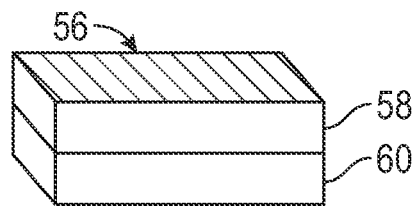
FIG. 4A illustrates a 2D and a 3D virtual display according to an exemplary embodiment.
Figure 4B:
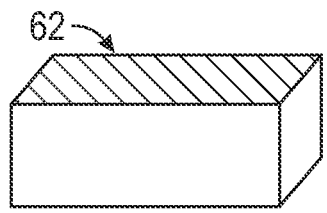
FIG. 4B illustrates a fully 3D virtual display according to an exemplary embodiment.
Figure 4C:
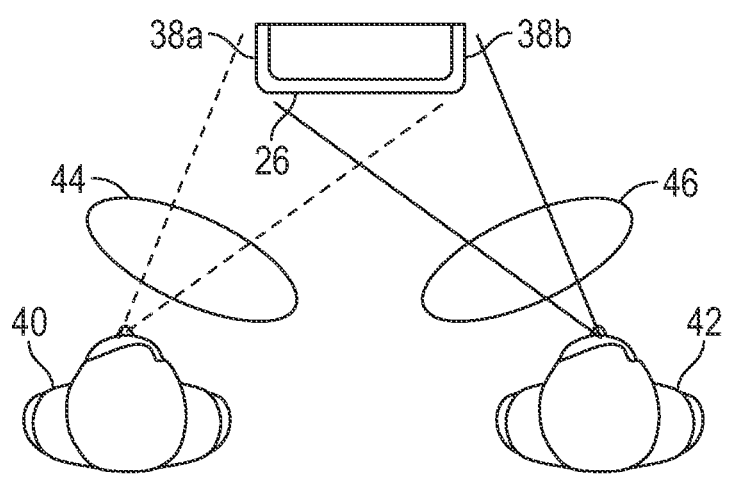
FIG. 4C illustrates multiples views of a display for two occupants of a motor vehicle.

Hence, as shown in FIG. 4C, for a virtual 3D volumetric display, the parallax barrier 48 is switched on for the central region 26 viewable by both the driver 40 and passenger 42 and is switched off in the regions that include the individual driver-side display 38a and the passenger-side display 38b. This configuration allows each user to view individualized content on both display regions viewable to them. Individualized content is stitched together on the two visible displays to create a virtual 3D volumetric display effect. The 3D effect can be utilized on the full display or a portion of the display. Additionally, one viewer can have a 2D/3D display 56 (FIG. 4A) with a 2D portion 58 and a 3D portion 60, and another viewer can have a completely 3D display 62 (FIG. 4B), or any combination thereof.

Figure 5A:
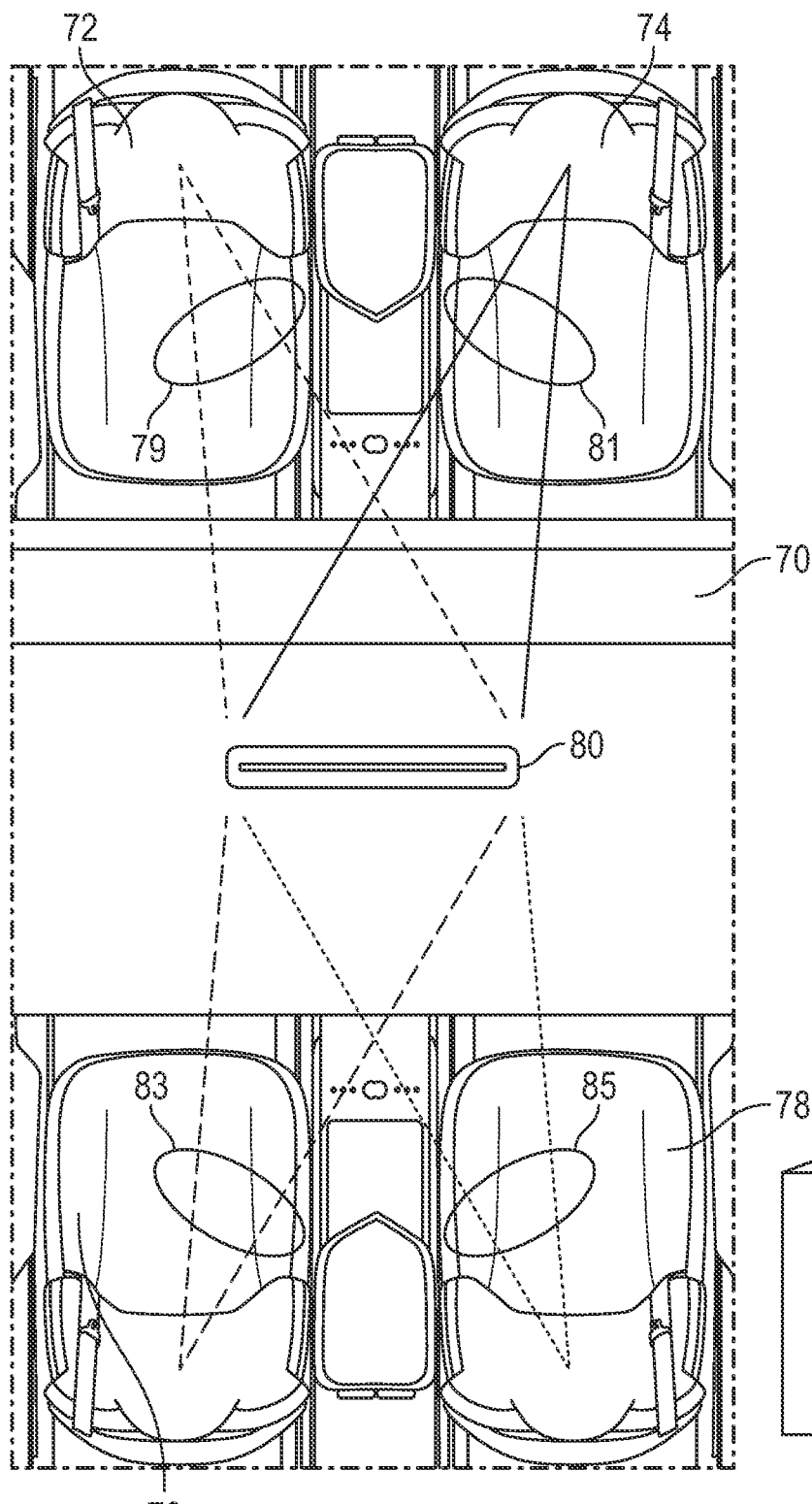
FIG. 5A illustrates a virtual 3D display for multiple occupants of a motor vehicle according to an exemplary embodiment.
Figure 5B:
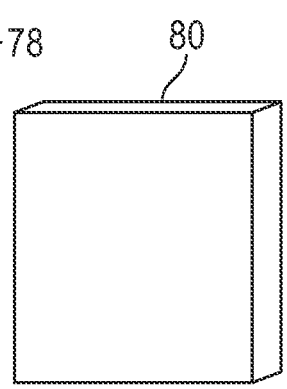
FIG. 5B is a close-up view of the virtual 3D display shown in FIG. 5A according to an exemplary embodiment.

FIGS. 5A through 5F show various implementations of a virtual 3D volumetric display. In FIG. 5A, a set of seats 72, 74, 76 and 78 are situated in a cabin 70 with viewing line of sites 79, 81, 83 and 85 of a display 80 (FIG. 5B). As such, the flat 2D display 80 is shaped for easy entry and exit of the occupants of the seats 72, 74, 76 and 78 with typical shared viewing on both sides of the display 80.

Figure 5C:
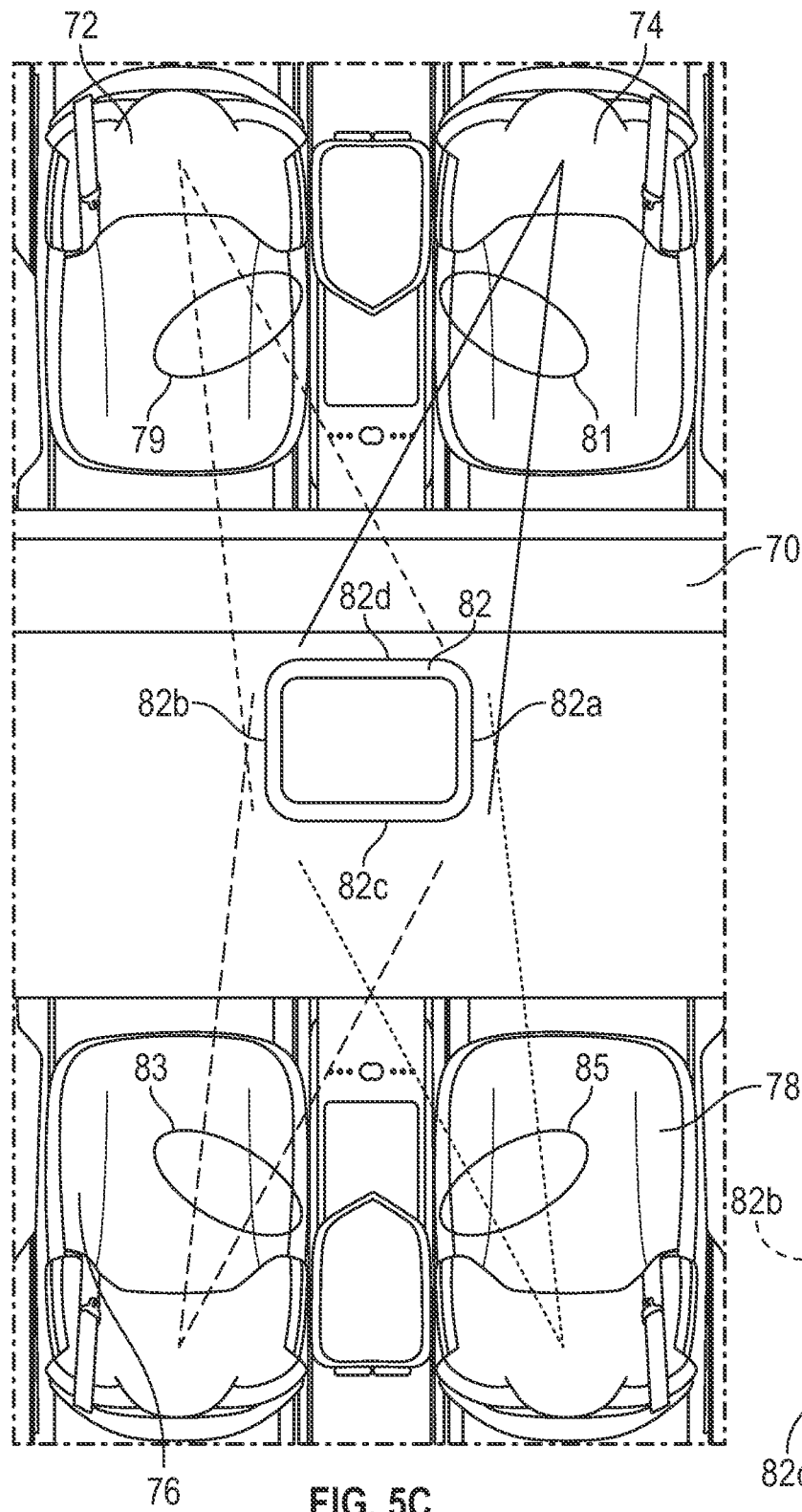
FIG. 5C illustrates another virtual 3D display for multiple occupants of a motor vehicle according to an exemplary embodiment.
Figure 5D:
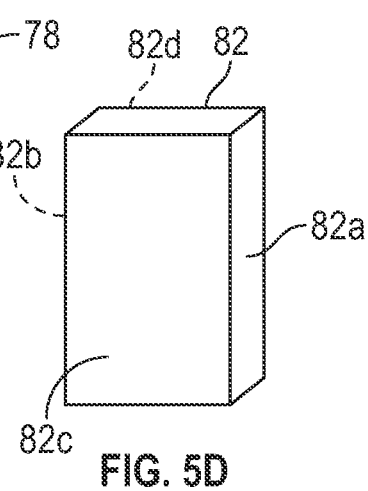
FIG. 5D is a close-up view of the virtual 3D display shown in FIG. 5C according to an exemplary embodiment.

In some implementations, a set of opposing plates are situated within the display 80 that are pushed outward to form a box 82 (FIGS. 5C and 5D). As such, a shared viewing area 82d is viewable by occupants in the seats 72 and 74, and a shared viewing area 82c is viewable by occupants in the seats 76 and 78. A viewing area 82b is viewable by occupants in the seats 72 and 76, and a viewing area 82a is viewable by occupants in the seats 74 and 78. Accordingly, stitching the viewing areas 82a, 82b, 82c and 82d together creates a virtual volumetric 3D display for all the occupants in the seats 72, 74, 76 and 78.

In other implementations, the set of opposing plates are pushed outward on a portion of the display 80 to form a partial 3D display 84 (FIGS. 5E and 5F). As such, the occupants of the seats 72 and 74 view a 2D viewing panel 88, while the occupants of the seats 76 and 78 view a virtual volumetric 3D display formed by a central viewing area 86c and two side areas 86a and 86b.

Figure 6:
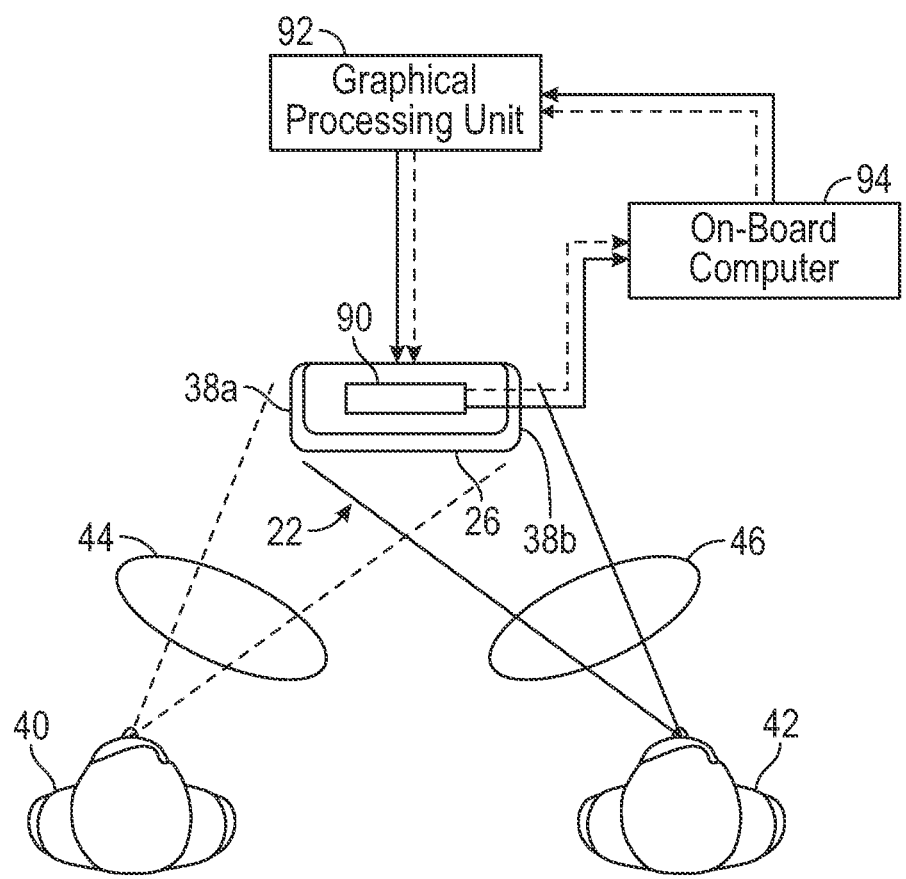
FIG. 6 illustrates a virtual 3D display with an eye tracker according to an exemplary embodiment.

Referring now to FIG. 6, certain implementations of the display 22 includes an eye-tracker 90 so that the virtual volumetric display provides the proper viewpoint to the viewers 40 and 42 to optimize the 3D appearance. Specifically, the eye-tracker 90 is utilized to determine the location and movement of the viewers' eyes. Graphical content is adjusted in real time by a graphical processing unit 92 and an on-board computer 94 to maintain the optimum virtual volumetric display effect.

In certain implementations of the aforementioned arrangements, 3D illusions are prioritized to utilize different applications while a driver makes various selections on a screen. After learning such behaviors through, for example, artificial intelligence, the application the driver is likely to utilize is highlighted by depth illusion. Since the illusion appears more reachable to the driver, this implementation increases the user experience of the driver.

In some implementations, the virtual 3D display is utilized as a situation awareness display to keep the driver informed about the vehicle status in semi-automated and fully-automated vehicles. As an example, visualization of a fluid is utilized as an intuitive indicator of a potential change in vehicle dynamics. In some implementations, the movement of fluid is utilized to intuitively reflect upcoming jerk, road curvature, acceleration, stopping distance, and left/right turns. White noise corresponding to the fluid movement is added in certain implementations to accommodate multi-task drivers, so that the driver does not have to look up to know what will happen next. Accordingly, the indication is shown to the user before the actual change in vehicle dynamics, so the user can be prepared for the change, which may reduce motion sickness.

Figure 7:
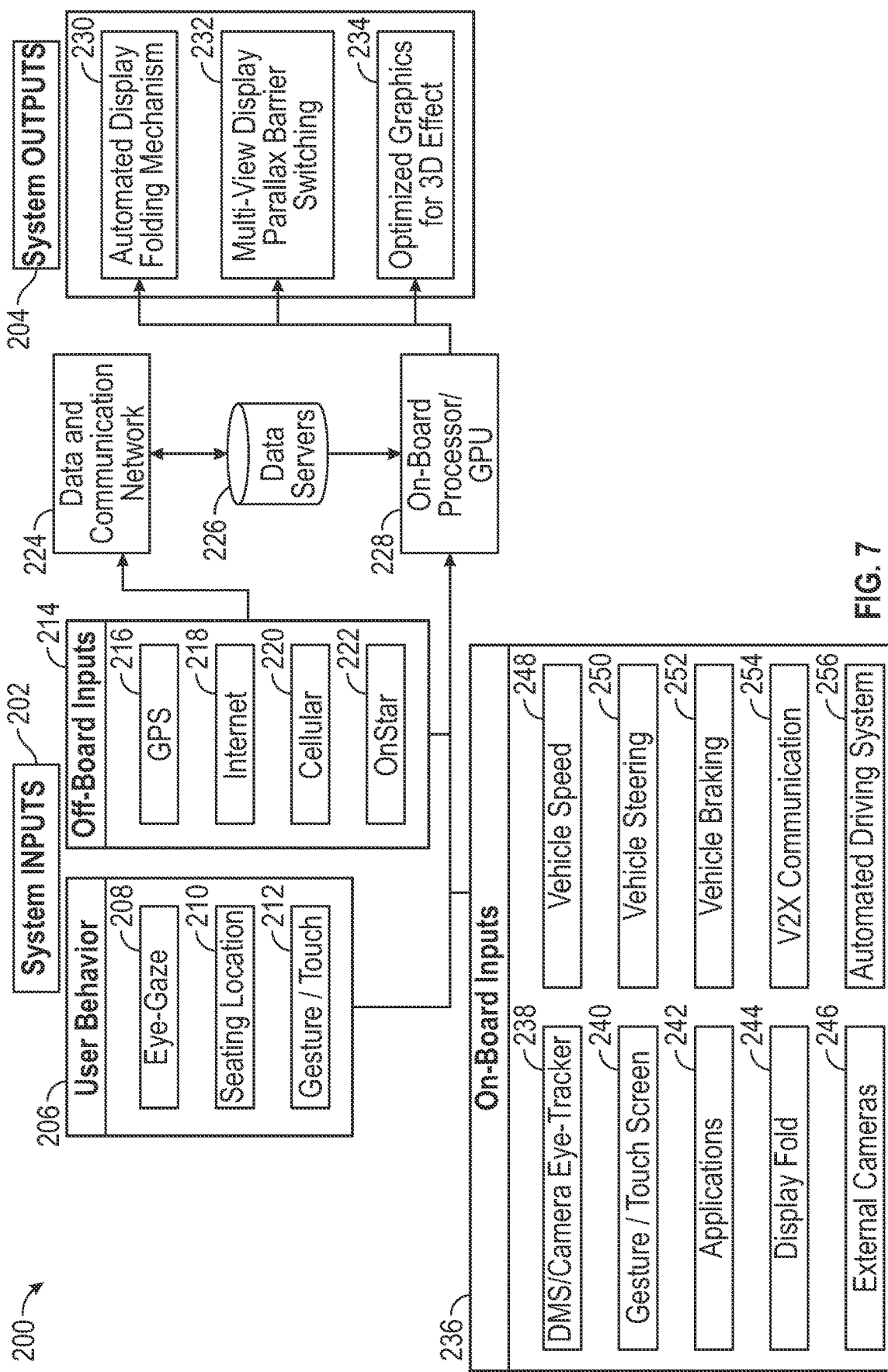
FIG. 7 is a block diagram of components for a virtual 3D display according to an exemplary embodiment.

Turning now to FIG. 7, there is shown a component diagram 200 for a virtual volumetric 3D display. A set of system inputs 202 includes user behavior 206, such as, for example, eye-gaze 208, seating location 210 and gesture/touch 212. Off-board inputs 214 include, for example, GPS 216, the internet 218, cellular input 220 and OnStar 222. On-board inputs include inputs from, for example, DMS/camera eye-tracker 238, gesture/touch screen 240, applications 242, display fold 244, external cameras 246, vehicle speed 248, vehicle steering 250, vehicle braking 252, V2X communication 254, and automated driving system 256.

The off-board inputs 214 are communicated through a data communication network 224 and data servers 226. Information from the data servers 226, the user behavior inputs 206, and the on-board inputs 236 are processed by an on-board processor and graphics processing unit (GPU) 228 System outputs 204 from the on-board processor and GPU 228 include, for example, an automated display folding mechanism 230, multi-view display barrier switching 232 and optimized graphics for 3D effects 234.

Figure 8:
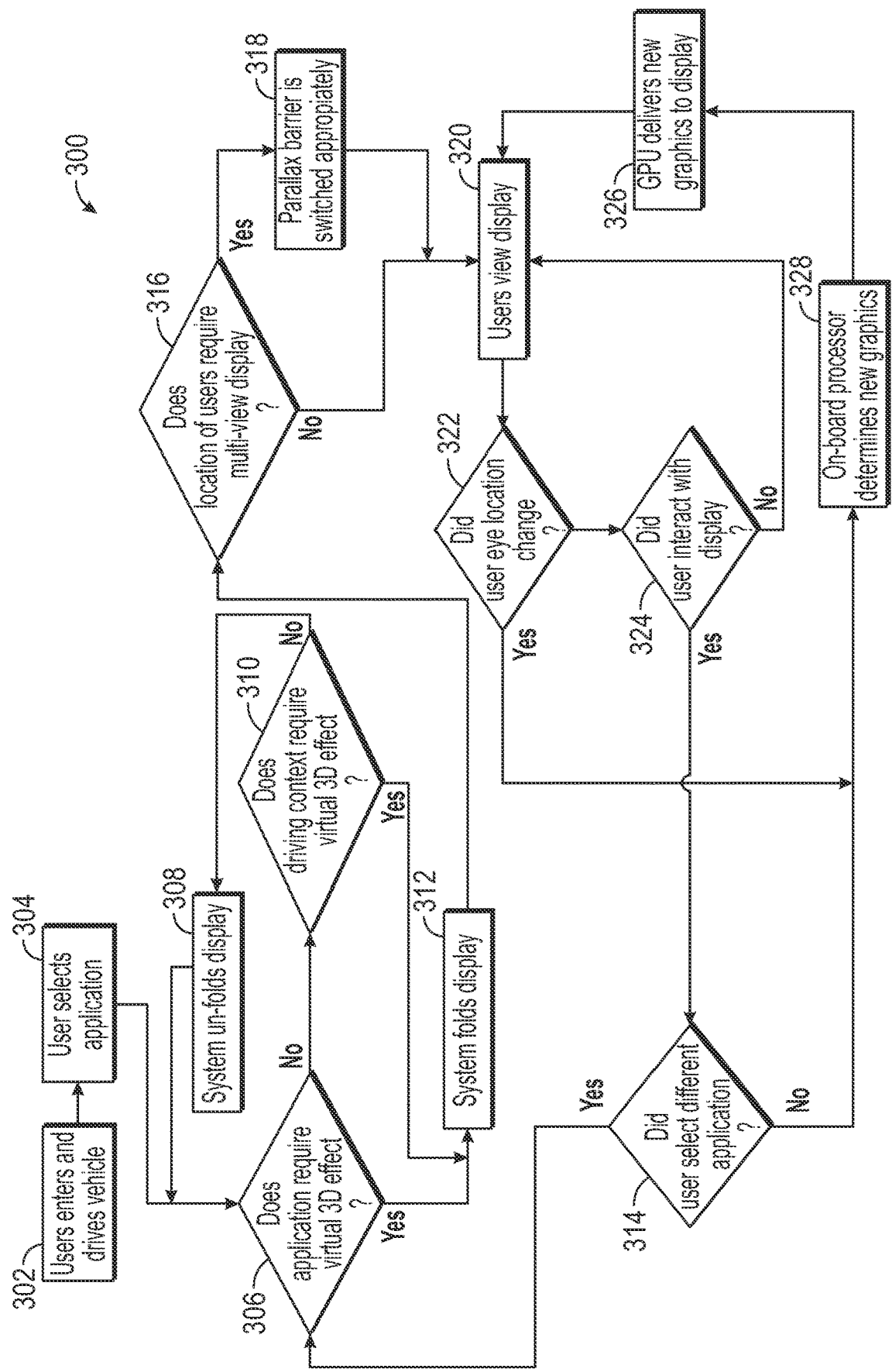
FIG. 8 is block diagram of a process for utilizing a virtual 3D display according to an exemplary embodiment.

Referring now to FIG. 8, there is shown a process 300 for implementing a virtual volumetric 3D display. Initially, a driver enters and drives the vehicle 302 and selects an application 304. The process 300 then determines in a decision step 306 is the selected application requires a virtual 3D effect. If the decision is no, the process determines in a decision step 310 is the driving context requires a virtual 3D effect. If the answer is no, the process unfolds the display. If the determination from either steps 306 or 310 is yes, the process 300 folds the display in step 312.

The process then proceeds to the decision step 316, which determines if the location of the user requires multi-view display. If the answer is no, the user views the display in step 320. If the answer is yes, the process 300 switches on a parallax barrier in step 318 before proceeding to step 320.

Next in decision step 322, the process 300 determines if the user's eye location changed. If the determination is yes, the on-board processor determines new graphics in step 328 and the GPU delivers new graphics to display in step 326 for the user to view in step 320. In the answer from the decision step 322 is no, then a decision step 324 determines if the user interacted with the display. If that answer is no, the process proceeds to step 320 for user viewing. If the answer is yes, the process proceeds to decision step 314 that determines is the user selected a different application. If the answer is no, the process 300 proceeds to step 328 to determine new graphics. And if the answer is yes, the process proceeds to step 306 to determine of the application requires virtual 3D effects.

A virtual 3D display of the present disclosure offers several advantages, including low costs and providing an association between a 3D environment and the actual world. Such a display is capable of being utilized as an infotainment display, a warning/navigation instruction carrier, a situation awareness (SA) display, or a room divider. The display is capable of use in manual, semi-autonomous and fully autonomous driving to increase SA and user experience.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A virtual 3D display for a motor vehicle, the display comprising:
   a substrate;
   a flexible display positioned on the substrate, the flexible display having two foldable sections and a main section; and
   a parallax barrier, wherein the parallax barrier in a first condition is turned on to provide two or more occupants of the motor vehicle personalized content in a first independent viewing area and a second independent viewing area, and wherein the parallax barrier in a second condition is turned off to provide shared viewing to multiple occupants of the motor vehicle,
   wherein the main section provides the shared viewing area and each of the foldable sections provides the first and the second independent viewing area.

2. The display of claim 1, wherein the first viewing area is viewable by a first occupant of the motor vehicle and the second viewing area is viewable by a second occupant of the motor vehicle.

3. The display of claim 1, wherein the first viewing area is unviewable by the second occupant and the second viewing area is unviewable by the first occupant.

4. The display of claim 1 further comprising an eye tracker to determine a location and movement of an occupant's eyes.

5. The display of claim 4, wherein the eye tracker communicates with an on-board computer and graphical processing unit to continuously optimize 3D effects for the occupant with regard to the occupant's viewing location.

6. The display of claim 1, wherein the display reconfigures itself when specific vehicle applications are selected or when a specific driving condition occurs.

7. A virtual 3D display for a motor vehicle, the display comprising:
   a substrate;
   a flexible display positioned on the substrate, the flexible display having two foldable sections and a main section;
   a sensor that enables interaction between an occupant of the motor vehicle the virtual 3D display; and
   an eye tracker to determine a location and movement of an occupant's eyes wherein the eye tracker continuously optimizes 3D effects for the occupant with regard to the occupant's viewing location, and wherein the eye tracker communicates with an on-board computer and graphical processing unit to continuously optimize 3D effects,
   wherein the main section providing a shared viewing area and each of the foldable sections providing a first and a second independent viewing area, and
   wherein the sensor detects gestures by the occupant or detects touches by the occupant.

8. The display of claim 7, wherein the display reconfigures itself when specific vehicle applications are selected or when a specific driving condition occurs.

9. The display of claim 7 further comprising a parallax barrier.

10. The display of claim 9, wherein the parallax barrier is turned on to provide two or more occupants of the motor vehicle personalized content.

* * * * *